United States Patent [19]

Hamill et al.

[11] 3,862,008

[45] Jan. 21, 1975

[54] PROCESS FOR DEACETOXYCEPHALOSPORIN C.

[75] Inventors: Robert L. Hamill, New Ross; Ramakrishnan Nagarajan, Indianapolis, both of Ind.

[73] Assignee: Eli Lilly and Company, Indianapolis, Ind.

[22] Filed: Dec. 3, 1973

[21] Appl. No.: 421,303

[52] U.S. Cl. .............................. 195/80 R, 195/36 R
[51] Int. Cl. .............................................. C12d 9/14
[58] Field of Search .......................... 195/36 R, 80 R

[56] References Cited
UNITED STATES PATENTS 3,719,563  3/1973  Hamill et al. ..................... 195/80 R
3,770,590  11/1973  Inamine ........................... 195/36 R Primary Examiner—Alvin E. Tanenholtz
Attorney, Agent, or Firm—William B. Scanlon; Everet F. Smith

[57] ABSTRACT

Deacetoxycephalosporin C is produced by culturing Streptomyces Clavuligerus NRRL 3585 and Streptomyces lipmanii NRRL 3584 under submerged aerobic fermentation conditions and is separated from other known metabolites and isolated chromatographically. Deacetoxycephalosporin C is useful in the preparation of 7-aminodeacetoxycephalosporanic acid, 7-ADCA.

3 Claims, No Drawings

PROCESS FOR DEACETOXYCEPHALOSPORIN C.

BACKGROUND OF THE INVENTION

Deacetoxycephalosporin C, represented by the following structural formula

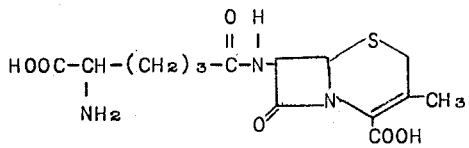

has been previously prepared by the hydrogenolysis of cephalosporin C as described by R. D. Stedman in U.S. Pat. No. 3,124,576.

Deacetoxycephalosporin C has also been named desacetoxycephalosporin C indicating that the acetoxymethyl group in the 3-position of the dihydrothiazine ring of cephalosporin C is replaced with a 3-methyl group. Deacetoxycephalosporin C is also named, 7-(5-amino-5-carboxyvaleramido)-3-methyl-3-cephem-4-carboxylic acid, according to the cepham nomenclature system.

Cephalosporin C, the first cephalosporin to be discovered (E. P. Abraham et al., U.S. Pat. No. 3,093,638) is produced by culturing Cephalosporium acremonium. Until recently the cephalosporia were the only microorganisms known to produce metabolites having the cephalosporin nucleus, i.e., a β-lactam ring fused to a dihydrothiazine ring. Recently, however, R. Nagarajan et al., J. Amer. Chem. Soc., 93, 2308–2310 (1971) reported the isolation of new cephalosporin compounds from the fermentation beer of two Streptomycetes, S. lipmanii and S. clavuligerus. The former streptomycete produces 7-(5-amino-5-carboxyvaleramido)-7-methoxy-3-acetoxymethyl-3-cephem-4-carboxylic acid (7-methoxycephalosporin C), while the latter streptomycete produces both 7-(5-amino-5-carboxyvaleramido)-7-methoxy-3-carbamoyloxymethyl-3-cephem-4-carboxylic acid and 7-(5-amino-5-carboxyvaleramido)-3-carbamoyloxymethyl-3-cephem-4-carboxylic acid.

It has now been discovered that S. lipmanii and S. clavuligerus produce a further metabolite, deacetoxycephalosporin C, which can be separated from the other metabolites and isolated in high purity.

Deacetoxycephalosporin C is an important cephalosporin compound. For example, it can undergo the well known N-deacylation reactions whereby the 7-(5-amino-5-carboxyvaleryl) side-chain is removed to produce 7-aminodeacetoxycephalosporanic acid (7-ADCA). The N-deacylation can be accomplished with nitrosyl chloride as described in U.S. Pat. No. 3,188,311, or by the well known phosphorus pentachloride cleavage method described, for example, by U.S. Pat. Nos. 3,549,628, 3,575,970, and 3,697,515. 7-ADCA is a useful intermediate which can be acylated to produce a wide variety of 7-acylamidodeacetoxycephalosporanic acids, notably, the antibiotic cephalexin.

SUMMARY OF THE INVENTION

This invention relates to a method for producing deacetoxycephalosporin C. In particular, it relates to a method for producing deacetoxycephalosporin C which comprises cultivating S. lipmanii NRRL 3584 and S. clavuligerus NRRL 3585 in aqueous nutrient culture media under submerged aerobic fermentation conditions.

Deacetoxycephalosporin C is recovered from the filtered fermentation broth along with the other co-produced antibiotics and is separated from the recovered mixture by chromatography. Deacetoxycephalosporin C is purified by further chromatography over cellulose.

DETAILED DESCRIPTION

According to the process of this invention, deacetoxycephalosporin C is produced by cultivating a streptomycete selected from the group consisting of Streptomyces lipmanii NRRL 3584 and Streptomyces clavuligerus NRRL 3585. The process is carried out by cultivating one of the above microorganisms in an aqueous nutrient culture medium containing assimilable sources of carbon, nitrogen, and inorganic salts under submerged aerobic fermentation conditions until a substantial amount of antibiotic activity is produced in the culture medium. In addition to deacetoxycephalosporin C, 7-methoxycephalosporin C, also designated as antibiotic A-16884, is co-produced by S. lipmanii. S. clavuligerus also co-produces along with deacetoxycephalosporin C, 7-(5-amino-5-carboxyvaleramido)-7-methoxy-3-carbamoyloxymethyl-3-cephem-4-carboxylic acid and 7-(5-amino-5-carboxyvaleramido)-3-carbamoyloxymethyl-3-cephem-4-carboxylic acid, both of which have been also designated respectively as antibiotics A-16886I and A-16886II. Although deacetoxycephalosporin C is produced by both microorganisms in lesser amounts than the other co-produced cephalosporins, it can be readily separated from these antibiotics and isolated in a purified form by chromatography as hereinafter described.

Both of the microorganisms employed in the method of this invention were isolated from soil samples obtained from South America. The organisms were isolated from the soil samples by suspending portions of the soil samples in sterile distilled water, and by streaking the suspensions on nutrient agar. The seeded nutrient agar plates were incubated at about 25°–35°C. for several days. At the end of the incubation period, colonies of microorganisms were transferred with a sterile platinum loop to agar slants. The agar slants were then incubated to provide suitable amounts of inoculum for the production of deacetoxycephalosporin C.

The strains of the microorganisms employed in the process are actinomycetes and have been identified by following the methods recommended for the International Streptomyces Project (Shirling et al., "Methods for Characterization of Streptomyces Species," Intern. Bull. Systematic Bacteriol., 16, 313–340 [1966]) for the characterization of Streptomyces species. Additional supplementary tests were also employed in the characterization.

The taxanomic characteristics of S. lipmanii NRRL 3584 and S. clavuligerus NRRL 3585 are presented in the following tables and paragraphs. In the tables, color names were assigned according to the ISCC-NBS method described by Kelly et al. in The ISCC-NBS Method of Designating Colors and a Dictionary of Color Names (U.S. Department of Commerce Circ. 553, Washington, D.C. 1955). Figures in parentheses refer to the Tresner and Backus color series (Tresner et al., "System of Color Wheels for Streptomyces Taxonomy," Appl Microbiol., 11, 335-338 [1963]) and color tab designations are underlined. The Maerz and Paul color blocks (Maerz et al., Dictionary of Color [McGraw-Hill Book Co., Inc., New York, 1950]) are enclosed in brackets. Cultures were grown at 30°C. for 14 days unless noted otherwise.

Morphology of S. Lipmanii NRRL 3584

Sporophores are usually straight to flexuous with occasional hooks produced; spores are short, cylindrical, $0.5-1.5\mu \times 1.0-2.5\mu$, and occur usually in chains of 3-10 and occasionally from 10-50. Spores are smooth in outline as observed by electron microscopy.

S. clavuligerus NRRL 3585 was difficult to classify in the genus Streptomyces because of its atypical sporophore morphology. However, data on cell wall analysis indicate that the culture should be considered a species in the Streptomyces genus. Accordingly, the organism is treated as a new species and given the name Streptomyces clavuligerus.

This organism characteristically produces an extensive network of short, sympodially branched aerial hyphae which eventually segment into spores. Short club-shaped side branches are formed which usually produce from one to four spores each. No substrate conidia are produced. Electron micrographs reveal smooth-walled spores. Cell wall preparations contain the L,L-isomer of diaminopimelic acid and glycine in

TABLE I

Culture Characteristics of S. lipmanii NRRL 3584

| Medium | Growth Characteristics |
|---|---|
| ISP No. 2 (Yeast-Malt Extract Agar) | Growth moderate, reverse dark grayish brown [8H9]; aerial mycelium pale yellow (Y) 2db. |
| ISP No. 3 (Oatmeal Agar) | Growth moderate, reverse dark grayish yellow [13E4]; aerial mycelium moderate, white (W) 13ba to pale yellow (Y) 2db. |
| ISP No. 4 (Inorganic salts and Soluble Starch Agar) | Growth moderate, reverse brownish gray [7C7]; aerial mycelium moderate, pale yellow (Y) 2db. |
| ISP No. 5 (Glycerol —Asparagine Agar) | Growth abundant, reverse light yellowish brown [1317]; aerial mycelium abundant, grayish yellowish pink (R) 5dc. |
| Tomato paste-oatmeal Agar | Growth abundant, reverse grayish yellowish brown [15E8]; aerial mycelium abundant, yellowish gray (GY) 2dc. |
| Emersons' Agar | Growth moderate, reverse dark grayish yellowish brown [8E9]; aerial mycelium and spores absent. |
| Bennetts' Agar | Growth abundant, reverse medium yellowish brown [14E7]; aerial mycelium abundant, grayish yellow (R) 3ec. |
| Czapeks' Agar | Growth scant, white; scant aerial mycelium (W) 13ba. |
| Glucose-asparagine Agar | Growth abundant, reverse grayish yellow [12D4]; aerial mycelium abundant, yellowish gray (GY) 2dc. |
| Tyrosine Agar | Growth moderate, reverse light yellowish brown [12C5]; aerial mycelium abundant, grayish yellow (R) 3ec. |
| Nutrient Agar | Moderate growth, reverse pale yellow [11C1]; no aerial mycelium. |
| Calcium Malate Agar | Moderate growth, reverse black [56C1]; very scant aerial mycelium. |
| Physiology | |
| Action on milk | Coagulation, peptonization. |
| Nitrate reduction | Positive |
| Melanin production | |
|   Peptone-iron agar | Negative |
|   Tryptone-yeast ext. broth | Negative |
| Temperature requirements on tomato paste-oatmeal agar | Abundant growth and sporulation at 26°C. and 30°C.; slight growth at 37°C; no growth at 43°C. |
| Response of vegetative color to pH change | |
|   0.05N HCl | Brownish-gray pigment changes to red. |
| 0.05N NaOH | No change. |
| Gelatin liquefaction | 100% |

In Table II are set forth the results of carbon utilization tests carried out on S. lipmanii NRRL 3584. In the table, the following symbols are employed:

+ = growth and utilization
− = no growth, no utilization

TABLE II

Carbon Utilization Pattern for NRRL 3584

| Compound | Growth Response |
|---|---|
| L-arabinose | − |
| sucrose | − |
| D-xylose | + |
| D-fructose | − |
| glucose | + |
| rhamnose | − |
| raffinose | − |
| i-inositol | − |
| D-mannitol | − |
| Control (no carbon) | − | addition to the major constituents, aspartic acid, glutamic acid, and alanine. Spores are gray en masse and primary mycelium is pale yellow to yellow-brown. No soluble pigment is produced. The culture has an optimum temperature range between 26° and 30°C. No growth occurs at 37°C. Morphologically, this culture resembles certain strains of Thermomonospora and Micromonospora.

The characteristics of S. clavuligerus NRRL 3585 are presented in the following tables and paragraphs.

Morphology of S. clavuligerus NRRL 3585

Sporophores are produced on an extensive aerial mycelium and consists of networks of short, sympodially-branched hyphae. Usually from one to four spores are born on short club-shaped side branches. Eventually sporophores segment to form chains of spores. Spores are $0.34-0.85\mu \times 0.85 \times 3.3\mu$, averaging $0.64\mu \times 1.53\mu$. Electron micrographs reveal smooth-walled spores. Spores are not produced in the substrate mycelium.

TABLE III

Culture Characteristics of *S. clavuligerus* NRRL 3585

| Medium | Growth Characteristics |
|---|---|
| ISP No. 2 (Yeast-Malt ext. agar) | Growth abundant, reverse grayish yellow [12K3]; aerial mycelium abundant, dark gray (G) 3*ih* [21B1]; no soluble pigment. |
| ISP No. 3 (Oatmeal agar) | Growth moderate, reverse pale yellow [11C1]; aerial mycelium fair, white (W) *b* [27A1]; no soluble pigment. |
| ISP No. 4 (Inorganic Salts-Starch agar) | Growth abundant, reverse grayish yellow [12B2]; aerial mycelium moderate, medium gray (GY) 2*fe* [45A1]; no soluble pigment. |
| ISP No. 5 (Glycerol-asparagine agar) | Growth fair, reverse pale yellow green [10B1]; aerial mycelium fair, white (W) *a*; no soluble pigment. |
| Tomato paste-oatmeal agar | Growth abundant, reverse grayish yellow [11E4]; aerial mycelium moderate, light grayish olive (GN) 1½*ig* [21B1]; no soluble pigment. |
| Emerson's agar | Growth abundant, reverse pale yellow [11C1]; aerial mycelium scant; no soluble pigment. |
| Bennett's agar | Growth abundant, reverse light yellow [11J2]; aerial mycelium abundant, dark grayish green (GN) 24½*ih* [23A3]; no soluble pigment. |
| Czapek's agar | Scant growth |
| Glucose-Asparagine agar | Growth moderate, reverse pale yellow green [10B1]; aerial mycelium fair, white (W) *b* [27A1]; no soluble pigment. |
| Tyrosine agar | Growth moderate, reverse pale yellow [10B2]; aerial mycelium moderate, yellowish gray (GY) 2*dc* [10A2]; no soluble pigment. |
| Nutrient agar | Growth fair, reverse pale yellow green [10B1]; aerial mycelium sparse, white; no soluble pigment. |
| Calcium malate | Growth abundant, reverse pale yellow green [10B1]; aerial mycelium fair, white (W) *a*. |
| Action on milk | No coagulation; clearing in 17 days. |
| Nitrate reduction | Negative. |
| Gelatin liquefaction | None |
| Growth response to pH changes | pH 5.0–6.0 in optimum range for growth; growth but no sporulation from pH 7.5–8.5. |
| Melanin production Peptone-iron agar and trytone-yeast ext. broth | None |
| Temperature requirements | Growth and sporulation good from 26–30°; no growth at 37° or above. |
| Major constituents of whole cell hydrolysates | L,L-diaminopimelic acid, glycine, glutamic acid, aspartic acid, alanine, and leucine. |

In Table IV are set forth the results of carbon utilization tests carried out on *S. clavuligerus* NRRL 3585. In the table, the following symbols are employed:
+ = growth and utilization
− = no growth, no utilization
(+) = probable utilization
(−) = questionable utilization

TABLE IV

Carbon Utilization Pattern for NRRL 3585

| Compound | Growth Response |
|---|---|
| Carbon Utilization | |
| L-arabinose | − |
| rhamnose | − |
| fructose | − |
| D-xylose | − |
| melezitose | (−) |
| raffinose | − |
| dextrose | − |
| cellobiose | − |
| maltose | + |
| sucrose | − |
| cellulose | − |
| inositol | (+) |
| mannitol | − |
| Na glutamate | (+) |

The streptomycetes of this invention have been placed on permanent deposit without restriction as to availability with the permanent culture collection of the Northern Utilization Research and Development Division, Agricultural Research Service, U.S. Department of Agriculture, Peoria, Illinois 61604. *Streptomyces lipmanii* has been assigned the culture No. NRRL 3584 and *Streptomyces clavuligerus* the culture No. NRRL 3585.

As previously stated, deacetoxycephalosporin C is produced by culturing either of the above described streptomycetes in aqueous nutrient culture medium under aerobic conditions. The culture medium employed can be any of a variety of media, since these microorganisms are capable of growing and producing the described metabolites by utilizing numerous sources of carbon, nitrogen, and inorganic salts. For large scale fermentation production where economy of production is a significant factor and where maximum yield of antibiotic and the ease of isolation thereof are important considerations, certain nutrient sources are preferred. For example, the media which are useful in the production of deacetoxycephalosporin C include assimilable sources of carbon such as glucose, starch, glycerin, molasses, dextrin, and the like. The preferred source of carbon is glucose. Additionally, employable media include sources of assimilable nitrogen such as soybean meal, corn steep solids, yeast, cottonseed meal, beef extract, peptones (meat or soy), casein, amino acid mixtures, and the like. Preferred sources of nitrogen are peptones, soybean meal, amino acid mixtures, and the like. Among the nutrient inorganic salts which can be incorporated in the culture media are the customary salts capable of yielding sodium, potassium, ammonium, calcium, phosphate, sulfate, chloride, carbonate, and like ions.

Minor elements necessary for optimum growth and development of the organism used for the production of deacetoxycephalosporin C can also be included in the culture medium. Such trace elements commonly occur as impurities in the other constituents of the medium in amounts sufficient to meet the growth requirements of the actinomycete employed in this invention.

The initial pH of the culture medium can be varied. However, it has been fouond desirable that the initial pH of the medium be between 6.5 and 7.2. As has been observed with other actinomycetes, the pH of the medium gradually increases throughout the growth period of the organism while the antibiotic is being produced, and may attain a level of from 6.7 to 7.5 or above, the final pH being dependent at least in part on the initial pH of the medium, the buffers present in the medium, and the period of time the organism is permitted to grow.

Submerged, aerobic cultural conditions are the conditions of choice for the production of deacetoxycephalosporin C. For preparation of relatively small amounts, shake flask and surface culture in bottles can be employed; but for the preparation of large amounts, submerged aerobic culture in sterile tanks is preferred. The medium in the sterile tank can be inoculated with a sporulated suspension; but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism; and when a young, active vegetative inoculum has been obtained, to transfer the vegetative inoculum aseptically to the large tank. The medium in which the vegetative inoculum is produced can be either the same as or different from the medium utilized for the large-scale production.

The microorganisms which produce deacetoxycephalosporin C will grow over a wide temperature range of between about 25°–37°C. Optimal production appears to occur at temperatures of 26°–30°C. In general, maximum production of the antibiotic occurs within about 36–72 hours after inoculation of the culture medium.

As is customary in aerobic, submerged culture processes, sterile air is blown through the culture medium. For efficient growth of the organism and antibiotic production, the volume of air employed in the tank production is from 0.2 to 0.4 volume of air per minute per volume of culture. The preferred volume is 0.40 volume of air per minute per volume of culture medium.

The concentration of antibiotic activity in the culture medium can be followed readily during the fermentation period by testing samples of the culture medium for their inhibitory activity against the growth of organisms shown to be inhibited by the presence of deacetoxycephalosporin C. The organisms Sarcina lutea and Salmonella gallinarum have been found to be useful for this purpose. The testing of the samples can be carried out by the well known turbidometric or disc plate methods.

In general, maximum production of antibiotic activity occurs within one to three days after inoculation of the culture medium in submerged aerobic culture or shake flask culture processes.

The antibiotic activity produced during the fermentation of both streptomycetes occurs in the antibiotic broth. Accordingly, isolation techniques employed in the present method are designed to permit maximum recovery of the antibiotic from the broth. Thus, for example, mycelium and undissolved solids are removed from the fermentation broth by conventional means such as filtration or centrifugation, and the mixture of antibiotics produced can be recovered from the filtered or centrifuged broth by employing extraction or adsorption technique.

Deacetoxycephalosporin C is recovered from the filtered fermentation broth as a component of the antibiotic mixture produced in the fermentation. Deacetoxycephalosporin C is then separated from the other antibiotic components in the mixture (for example, antibiotics A-16886I, A-16886II, and A-16884 previously discussed) and isolated as an essentially pure compound by column chromatography.

For the recovery of the antibiotic mixture by adsorption techniques, ion exchange resins are preferred, however, recovery can also be achieved with adsorption materials such as carbon, silica gel, alumina or cellulose.

Deacetoxycephalosporin C, and the aforementioned co-produced antibiotics can exist in the fermentation broth in the salt form or in the amphoteric form (zwitterionic form) depending on the final pH of the broth. The mixture of antibiotics can be recovered and separated from one another by adsorption chromatography or by ion exchange chromatography when they exist in either form or as mixtures thereof.

Preferred ion exchange resins for the recovery of the antibiotic mixture are those of the cross-linked polystyrene quaternary ammonium type sold commercially under the tradenames of Amberlite and IRA resins (Rohm and Haas Co., Philadelphia, Pa.) and Dowex resin (Dow Chemical Co.), for example IRA-68 and Dowex 1 resins.

The filtered fermentation broth is passed over a column packed with an anionic resin such as IRA-68 and thereafter the antibiotics are eluted therefrom with an aqueous solution of ammonium acetate, sodium acetate, or ammonium formate. The antibiotics are eluted in the form of the salt formed with the cation from the eluting salt solution. Prior to ion exchange chromatography, the antibiotics are separated from the filtered fermentation broth and partially purified by adsorption on activated carbon.

Following the recovery of the mixture of antibiotics containing deacetoxycephalosporin C from the anion exchange column, excess inorganic materials such as excess salt from the eluting salt solution, for example, ammonium formate, can be removed from the resin eluate by chromatography of the eluate over carbon.

The thus recovered and purified mixture of antibiotics is then chromatographed over silica gel or cellulose (microcrystalline) to obtain separation of the individual antibiotic components of the mixture.

According to one embodiment of this invention S. lipmanii NRRL 3584 is cultured in an aqueous nutrient culture medium for 6 days at a temperature of approximately 30°C. The mycelium and other insolubles are filtered with the aid of a filter aid and the filtered broth is passed over a column packed with activated carbon. The column is washed with water to remove impurities and the antibiotic activity is eluted with aqueous acetone. Multiple fractions are collected and active fractions are combined. The combined fractions are evaporated under reduced pressure to remove the acetone. The aqueous concentrate is then chromatographed over a basic anion exchange resin of the polystyrene quaternary ammonium type such as that solid commercially as Amberlite IRA-68 resin (Rohm and Haas, Philadelphia, Pa.) in the formate or acetate cycle. The column is washed with water and thereafter the antibiotic activity is eluted with a dilute aqueous ammonium formate solution of about 0.1 Molar. Multiple fractions of eluate are collected and active fractions are combined and further purified by chromatography over activated carbon. The antibiotic containing eluate is concentrated and freeze-dried. The freeze-dried preparation is dissolved in water and the solution is chromatographed over silica gel. Elution of the column is carried out with aqueous acetonitrile or other suitable solvent. Multiple fractions of eluate are collected. The early fractions contain the antibiotic A-16884, 7-(5-amino-5-carboxyvaleramido)-7-methoxy-3-acetoxymethyl-3-cephem-4-carboxylic acid as the ammonium salt. Thereafter, fractions containing a mixture of A-16884 and penicillin N are eluted. The later fractions contain deacetoxycephalosporin C as the ammonium salt.

The free acid form of deacetoxycephalosporin C can be obtained by adjusting the pH of an aqueous solution of the ammonium salt to the isoelectric point. Alternatively, the free acid can be obtained by treating an aqueous solution of the salt with an acidic ion exchange resin and employing sufficient acidic resin to adjust the pH of the solution to about pH 2.5. The resin is filtered from the acidic solution and the filtrate is freeze-dried to provide the free acid form.

In a further embodiment of the process of this invention S. clavuligerus NRRL 3585 is cultured in an aqueous nutrient medium for about 6 days, the mycelium is filtered and the filtered broth is chromatographed over activated carbon and then over a basic anion exchange resin of the polystyrene quaternary ammonium type such as those commercially available under the tradenames of Dowex (Dow Chemical Co., Midland, Mich.) and Amberlite IRA (Rohm and Haas, Philadelphia, Pa.). Preferably, the resins are employed in the formate or acetate cycle. The eluate from the exchange resin is rechromatographed over activated carbon to remove excess inorganics, then over dextran and finally over silica gel. The silica gel column is eluted with aqueous acetonitrile and multiple fractions are collected. Biologically active fractions are combined and evaporated or preferably freeze-dried. The freeze-dried mixture of antibiotic metabolites contains as a minor component, deacetoxycephalosporin C. The deacetoxycephalosporin C is separated from the mixture by first subjecting the mixture to chromatography over microcrystalline cellulose (Avicel) followed by separation of metabolites over Amberlite XAD-4 resin. The freeze-dried mixture is dissolved in water and passed over a column packed with microcrystalline cellulose. The column is eluted with a mixture of acetonitrile:n-propanol:water (1:1:0.5 v:v:v), and active eluate fractions are combined and concentrated in vacuo and the concentrate is lyophilized. The lyophilized antibiotic mixture is dissolved in water and is then chromatographed over Amberlite XAD-4resin. The column is eluted with water and multiple fractions are collected. The eluate fractions are monitored by paper chromatography or by microbiological assay and all fractions shown to contain only deacetoxycephalosporin C are combined and lyophilized. Early eluate fractions contained the known antibiotics A-16886I and 16886II named, 7-(5-amino-5-carboxyvaleramido)-7-methoxy-3-carbamoyloxymethyl-3-cephem-4-carboxylic acid and 7-(5-amino-5-carboxyvaleramido)-3-carbamoyloxymethyl-3-cephem-4-carboxylic acid, respectively.

The following examples are provided to further illustrate the process of this invention.

EXAMPLE 1

SHAKE FLASK PRODUCTION OF DEACETOXYCEPHALOSPORIN C

A sporulated culture of *Streptomyces lipmanii* NRRL 3584 was produced by growing the organism on a nutrient agar slant having the following composition:

| | |
|---|---|
| Dextrin | 10.00 g. |
| Yeast Extract | 1.00 g. |
| Hydrolyzed Casein ("N-Z Amine-Type A," Sheffield Chemical Company) | 2.00 g. |
| Beef Extract | 1.00 g. |
| Meer Agar (washed three times) | 20.00 g. |
| Deionized water | 1 liter |

The pH of the medium was adjusted to pH 7.0 by the addition of sodium hydroxide.

The agar slant was inoculated with spores of *Streptomyces lipmanii* NRRL 3584 and was incubated for 6 days at 30°C. The agar slant was then covered with sterile distilled water and gently scraped to remove the spores and cells as an aqueous suspension thereof. One milliliter of the resulting suspension was used to inoculate each 100 ml. portion of a vegetative medium having the following composition:

| | |
|---|---|
| Glucose | 15.00 g. |
| Soybean meal | 15.00 g. |
| Cornsteep solids | 5.00 g. |
| Calcium carbonate | 2.00 g. |
| Sodium chloride | 5.00 g. |
| Deionized water | 1 liter |

The pH of the vegetative medium was adjusted to pH 6.7 by the addition of sodium hydroxide.

The vegetative medium was shaken for 36 hours at 30°C. on a reciprocal shaker with a two-inch stroke at 108 rpm. The medium thus prepared was then utilized as the inoculum for the production medium.

A production medium was prepared having the following composition:

| | |
|---|---|
| Soybean meal | 15.00 g. |
| Casein | 1.00 g. |
| Sodium nitrate | 3.00 g. |
| Glucose syrup (50 percent glucose) | 20.00 g. |
| Tap water | 1 liter |

One hundred milliliter portions of the production medium were placed in 500 milliliter Erlenmeyer flasks which were sterilized at 120°C. for 30 minutes. When cooled, each flask was inoculated with a five percent vegetative inoculum. The fermentation was shaken for 72 hours at 30°C. on a rotary shaker operating at 250 rpm. During the fermentation, the medium was aerated with sterile air at a rate of 0.4 v./v./min. Isolation was carried out essentially as reported hereinbelow in Example 3.

EXAMPLE 2

Deacetoxycephalosporin C was produced according to the process of Example 1, but utilizing a production medium having the following composition:

| | |
|---|---|
| Distillers' solubles (Nadrisol) | 5.00 g. |
| Soybean flour (Nutrisoy 200D) | 5.00 g. |
| Peanut meal | 5.00 g. |
| Blackstrap molasses | 5.00 g. |
| Oatmeal | 5.00 g. |
| Glycerol | 10.00 g. |
| Tap water | 1 liter | and utilizing instead of a rotary shaker a reciprocal shaker operating at 108 strokes per minute.

EXAMPLE 3

PILOT PLANT PRODUCTION OF DEACETOXYCEPHALOSPORIN C

To a 40-liter stainless steel fermentor were added 24 liters of a medium having the following composition:

| | |
|---|---|
| Antifoam A (an anti-foaming agent sold by Dow Corning) | 0.20 g. |
| Glucose | 5.00 g. |
| Dextrin 700 | 50.00 g. |
| Soybean grits | 25.00 g. |
| Molasses, blackstrap | 3.00 g. |
| Potassium biphosphate | 0.25 g. |
| Calcium carbonate | 2.50 g. |
| Cold tap water | to 25 liters |

The initial pH was 6.5 and was not adjusted. The medium was sterilized for 30 minutes at 120°C., cooled, and then inoculated with a five percent vegetative inoculum produced as in Example 6. The fermentation was carried out at 30°C. for 66 hours, aerated with sterile air at the rate of 0.35 v./v./min., and agitated by a mechanical stirrer operated at 420 revolutions per minute. The terminal pH was 7.5.

Approximately 60 liters of broth obtained as described above was filtered with the aid of Hyflo Super-cel (a diatomaceous earth sold by Johns-Manville Products Corporation). The broth filtrate was passed over a 9.6 × 150 cm. column packed with carbon (Pittsburgh CAL. 12 × 40, sold by Pittsburgh Activated Carbon Co.). The column was washed with water until the effluent was colorless, and the activity adsorbed on the carbon was removed by passing 50 percent aqueous acetone over the column. The fractions containing the activity were combined, concentrated in vacuo to remove acetone, and applied to a 5.9 × 104 cm. column packed with IRA-68 resin (formate cycle) (an anion exchange resin sold by Rohm and Haas Co. and subsequently washed with formic acid to convert the resin to the formate cycle). The column was washed with water until the effluent was clear and colorless, and the activity was removed by washing with 0.1M ammonium formate solution. The active fractions were combined, and passed over a 4.3 × 72 cm. carbon (Pittsburgh CAL. 12× 40) column. The column was washed with six column volumes of water, and the activity was eluted with 30 percent aqueous acetonitrile. The active fractions were combined, concentrated in vacuo to remove acetonitrile, and freeze dried. The yield was 25–30 grams of solids.

The freeze-dried preparation was dissolved in a minimum of water and applied to a 7.2 × 60 cm. column packed with a microcrystalline cellulose product (Avicel, sold by FMC Corporation), suspended in 70 percent aqueous acetonitrile, and washed with acetonitrile prior to addition of the active sample. After application of the sample, the column was washed with one column volume of acetonitrile, and the activity was eluted with methanol. The active fractions were combined and concentrated to approximately 200 milliliters, and the activity was precipitated by the addition of 10 volumes of acetone. The precipitate was filtered, washed with acetone, and dried in vacuo. The yield was 9–12 g.

Twenty grams of material obtained as described above was dissolved in a minimum of water and applied to a silica gel column (7.2 × 60 cm.). The silica gel (Grade 950 produced by Davison Chemical) was previously washed with water, then methanol, and suspended in 70 percent acetonitrile for packing the column. After application of the sample, the column was washed with one column volume of acetonitrile, and the activity was eluted with 70 percent acetonitrile. Multiple fractions were collected and small aliquots thereof were run on paper chromatograms for identification of the antibiotic factor present in each fraction. The known antibiotic A-16884 (7-methoxycephalosporin C) came off the column in the earlier fractions, while deacetoxycephalosporin C was collected in the later fractions. All fractions shown by paper chromatography to contain only deacetoxycephalosporin C were combined and freeze-dried.

The lyophilized preparation obtained by the foregoing isolation and purification procedure was substantially pure deacetoxycephalosporin C in the form of the ammonium salt.

EXAMPLE 4

ISOLATION OF DEACETOXYCEPHALOSPORIN C AS THE MONOSODIUM SALT

Approximately 60 liters of broth, obtained as reported in Example 3, were filtered with the aid of Hyflo-Super-cel. The broth filtrate was passed over a 9.6 × 150 cm. column packed with carbon (Pittsburgh CAL. 12 × 40). The column was washed with water until colorless, and the absorbed activity was removed by passing 50 percent aqueous acetone over the column. The fractions containing the activity were combined, concentrated in vacuo to remove the acetone, and applied to a 5.9 × 104 cm. column packed with IRA-68 (acetate cycle). The column was washed with water until the effluent was clear and colorless, and the activity was removed by washing with 0.1M sodium acetate. The active fractions were combined, and passed over a 4.3 × 72 cm. column packed with Pittsburgh CAL. (12 × 40) carbon. The column was washed with six column volumes of water, and the activity was eluted with 30 percent aqueous acetone. The active fractions were combined, concentrated in vacuo to remove the acetone, and freeze dried. Yield of 20–30 g. Analysis showed 2.5 percent sodium.

The crude antibiotic mixture as the sodium salts was chromatographed over microcrystalline cellulose (Avicel) and thereafter the monosodium salt of deacetoxycephalosporin C was separated from the mixture of salts over silica gel by following the chromatographic separation procedures employed in Example 3 for the isolation of the ammonium salt of deacetoxycephalosporin C.

The product was chromatographically indistinguishable from deacetoxycephalosporin C prepared by the hydrogenation of cephalosporin C (U.S. Pat. No. 3,124,576). The product had the following properties:

Elemental analysis for: $C_{14}H_{18}N_3O_6SNa$:

| | Theory C, 44.32; | H, 4.78; | N, 11.08; | S, 8.45 |
|---|---|---|---|---|
| S, 7.88. | Found: | C, 44.80; | H, 5.34; | N, 11.74; |

Infrared absorption spectrum (mull) $1755^{-1}$ cm. for the $\beta$-lactam carbonyl.

Ultraviolet absorption spectrum ($H_2O$) $\lambda$ max 260 m$\mu$ ($\epsilon$5800)

Potentionmetric titration (66 percent DMF): initial pH of 5.0 pKa at 4.0, 5.8, and 10.6

Nuclear magnetic resonance spectrum ($D_2O$): 5.60 (1H, d, J= 4.5), 5.14 (1H, d, J= 4.5), 3.98 (1H, m), 3.65 (1H, d, J=18), 3.33 (1H, d, J=18 Hz), 2.55-2.35 (2H, m), 2.06 (3H, s), and 2.15-1.55 $\delta$(4H, m). In the foregoing nmr data s=singlet, d=doublet, and m=multiplet.

EXAMPLE 5

PREPARATION OF DEACETOXYCEPHALOSPORIN C FREE ACID

The monosodium salt of deacetoxycephalosporin C prepared as described in Example 4, was dissolved in distilled water and the sulfonated polystyrene resin AG 50W-X4 (Bio-Rad laboratories) was added to the solution in small portions with stirring until the pH of the mixture was adjusted to pH 2.5. The resin was then filtered and the filtrate was lyophilized to obtain deacetoxycephalosporin C free acid as a dry amorphous solid.

EXAMPLE 6

PRODUCTION OF DEACETOXYCEPHALOSPORIN C WITH S. CLAVULIGERUS NRRL 3585

A sporulated culture of *Streptomyces clavuligerus* NRRL 3585 was produced by growing the organism on a nutrient agar slant having the following composition:

| | |
|---|---|
| Dextrin | 10.00 g. |
| Yeast Extract | 1.00 g. |
| Hydrolyzed Casein ("N-Z Amine-Type A," Sheffield Chemical Company) | 2.00 g. |
| Beef extract | 1.00 g. |
| Meer Agar (washed three times) | 20.00 g. |
| Deionized water | 1 liter |

The pH of the medium was adjusted to pH 7.0 by the addition of sodium hydroxide.

The agar slant was inoculated with spores of *Streptomyces clavuligerus* NRRL 3585 and was incubated for 4–6 days at 30+C. The agar slant was then covered with sterile distilled water and gently scraped to remove the spores and cells as an aqueous suspension thereof. One milliliter of the resulting suspension was used to inoculate each 100 ml. portion of a vegetative medium having the following composition.

| | |
|---|---|
| Glucose | 15.00 g. |
| Soybean meal | 15.00 g. |
| Cornsteep solids | 5.00 g. |
| Calcium carbonate | 2.00 g. |
| Sodium chloride | 5.00 g. |
| Deionized water | 1 liter |

The pH of the vegetative medium was adjusted to pH 6.7 by the addition of sodium hydroxide.

The vegetative inoculum was shaken for 24–48 hours at 30°C. on a reciprocal shaker with a 2-inch stroke at 108 rpm. The inoculum so prepared was then utilized in the production of deacetoxycephalosporin C as follows:

To a 40-liter stainless steel fermentor were added 24 liters of a medium having the following composition:

| | |
|---|---|
| Antifoam A (an anti-foaming agent sold by the Dow Corning Company) | 5.00 g. |
| Starch | 1125.00 g. |
| Nadrisol | 125.00 g. |
| Soybean flour grits | 500.00 g. |
| Glycerol | 187.50 g. |
| N-Z amine A | 125.00 g. |
| Ferrous sulfate heptahydrate | 2.50 g. |
| Cold tap water | to 24 liters |

The initial pH was 5.9 and was adjusted to pH 6.5 with approximately 20 ml. of 5N sodium hydroxide. The medium was sterilized for 30 minutes at 120°C. and 15–18 psig., cooled, and then inoculated with five percent by volume of the vegetative inoculum. The fermentation was carried out at 30°C. for 66 hours, aerated with sterile air at the rate of 0.35 v./v./min., and agitated by a mechanical stirrer operated at 420 revolutions per minute. The terminal pH was 6.3

Approximately 75 liters of whole broth, obtained by combining whole broth from three fermentations carried out as described above, were filtered with the aid of Hyflo Super-Cel (a diatomaceous earth sold by Johns-Manville Products), 5 grams per 100 milliliters. The broth filtrate was passed over a 9.5 cm. × 130 cm. column packed with 8 liters of carbon (Pittsburgh CAL. 12 × 40), at the rate of 60 ml. per minute. The column was washed with 10 liters of deionized water (pH 5.2) and the activity adsorbed on the carbon was removed by passing 50 percent aqueous acetone over the column. The fractions containing the antibiotic activity were combined, concentrated *in vacuo* to remove acetone, and applied to a 9.5 cm. × 140 cm. column packed with Dowex 1-X1(a strong basic anion exchange resin sold by the Dow Chemical Co.), in the formate cycle. The column was washed with 10 liters of deionized water, and the activity was removed with 0.1 M ammonium formate. The active fractions were combined, and passed over a 9.5 cm. × 100 cm. column packed with carbon (Pittsburgh CAL. 12 × 40), at the rate of 60 ml. per minute. The column was washed with water; and the activity was then eluted with ¼ acetone: water at 60 ml. per minute, yielding 15 two-liter fractions, and thereafter with 1:1 acetone:water, yielding 18 one-liter fractions. The active fractions were combined, concentrated *in vacuo* to remove acetone, and lyophilized.

Forty grams of combined lyophilized preparations, each preparation as discussed above, were extracted with 4 liters of methanol by stirring magnetically for 16 hours; the methanol insolubles were filtered off and the methanol soluble portion precipitated with 5 volumes of acetone. The precipitate was separated by filtration and dried. Yield was 20.6 grams.

This preparation was dissolved in a minimum of water and applied to a 5.8 cm. × 120 cm. column packed with dextran (Sephadex G-25 at a rate of 1 ml. per minute. The activity was eluted with deionized water, and the active fractions were combined and lyophilized.

Ten grams of material obtained as described was dissolved in 256 ml. of acetonitrile:water (55:45) and applied to a 5.5 cm. × 85 cm. column packed with silica gel prepared in acetonitrile:water (7:3) solvent. Application was at the rate of 3 ml. per minute. After application of the sample, the column was eluted with acetonitrile:water (7:3) at 5 ml. per minute flow rate. The most active fractions were combined, concentrated to dryness *in vacuo*, and lyophilized.

Fifty grams of the above lyophilized antibiotic mixture, prepared by combining material from several runs carried out as described above, were dissolved in 80 ml. of water and the solution was adsorbed into microcrystalline cellulose (Avicel). The mixture was dried and then applied to a 7.4 × 115 cm. column packed with Avicel in acetonitrile: n-propanol:water (1:1:0.5, v:v:v). The column was eluted with the same solvent system at a rate of 18 ml. per minute. One liter fractions of eluate were collected and all such fractions containing deacetoxycephalosporin C, as shown by paper chromatography or microbiological assay, were combined, concentrated under reduced pressure and the concentrate was lyophilized to yield substantially pure deacetoxycephalosporin C ammonium salt.

Twelve grams of the freeze-dried product was further purified in the following manner. The material was dissolved in 75 ml. of water and the solution applied to a 3.0 × 70 cm. column packed with Amberlite XAD-4 resin prepared in water. The product was eluted with water at a rate of 2.5 ml. per minute while multiple fractions of eluate of 20 ml. each were collected. The eluate fractions were monitored by paper chromatography and microbiological assay. Those fractions containing only deacetoxycephalosporin C were pooled and lyophilized to yield deacetoxycephalosporin C of higher purity.

We claim:

1. A method for producing deacetoxycephalosporin C which comprises cultivating in an aqueous nutrient culture medium containing assimilable sources of carbon, nitrogen, and inorganic salts under submerged aerobic fermentation conditions a streptomycete selected from the group consisting of *Streptomyces lipmanii* NRRL 3584 and *Streptomyces clavuligerus* NRRL 3585 until a substantial amount of antibiotic activity is produced by said streptomycete in said culture medium and isolating said deacetoxycephalosporin C from said culture medium.

2. The method of claim 1 wherein the streptomycete is *S. lipmanii* NRRL 3584.

3. The method of claim 1 wherein the streptomycete is *S. clavuligerus* NRRL 3585.

* * * * *